(No Model.)
J. J. CALLENDER.
HARROW.
No. 509,791. Patented Nov. 28, 1893.
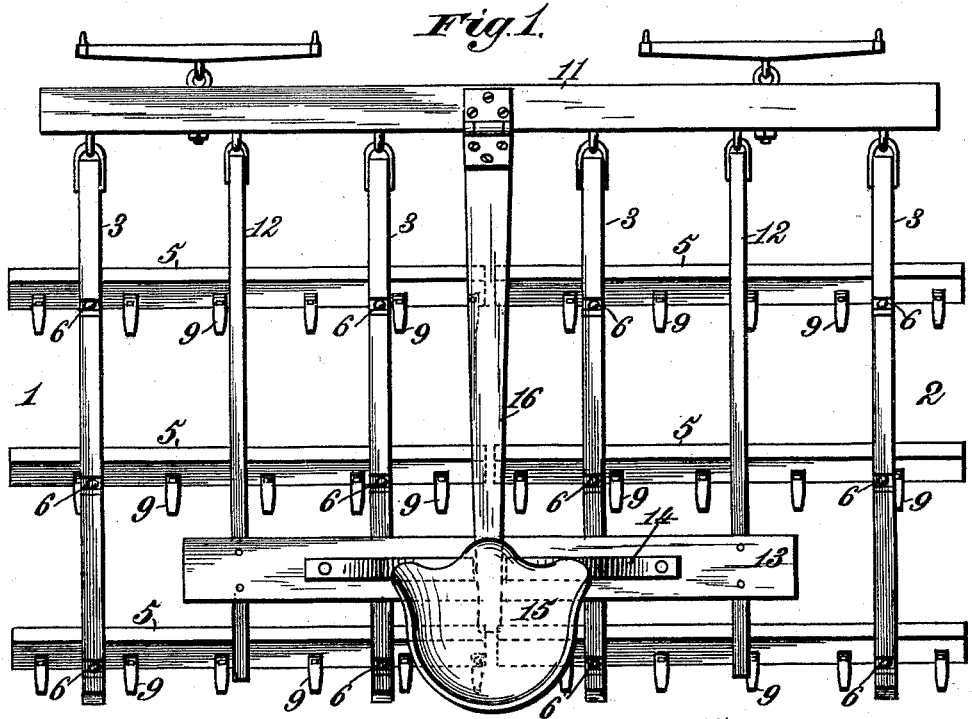
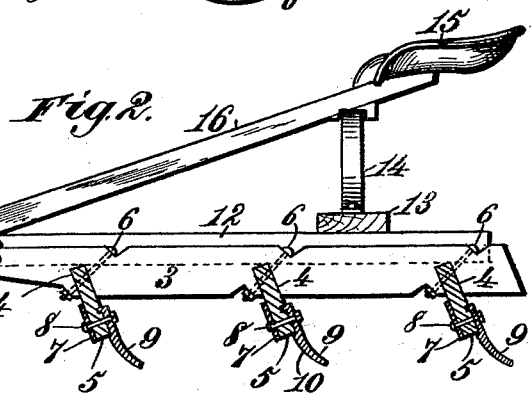
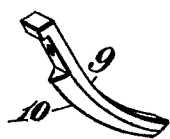
Witnesses.
Inventor:
James J. Callender.
By James L. Norris
Atty.

UNITED STATES PATENT OFFICE.

JAMES J. CALLENDER, OF GENESEO, ILLINOIS.

HARROW.

SPECIFICATION forming part of Letters Patent No. 509,791, dated November 28, 1893.

Application filed August 1, 1893. Serial No. 482,078. (No model.)

*To all whom it may concern:*

Be it known that I, JAMES J. CALLENDER, a citizen of the United States, residing at Geneseo, in the county of Henry and State of Illinois, have invented new and useful Improvements in Harrows, of which the following is a specification.

This invention relates to improvements in that class of agricultural implements commonly known as a combined harrow, clod-crusher, and land-leveler, and has for its objects to construct a device of this character which shall be simple and durable in construction, easy of manipulation, and comparatively inexpensive in its manufacture.

To these ends my invention consists in the novel features of construction and new combinations of parts hereinafter described and more particularly pointed out in the claims.

In order to enable others skilled in the art to which my invention pertains, to make, use and construct the same I will proceed to describe its several parts in detail, reference being made to the accompanying drawings forming a part of this specification, in which—

Figure 1, is a plan view of my improved device complete. Fig. 2, is a vertical section taken on the line of draft. Fig. 3, is an enlarged view of one of the teeth or blades.

Referring now to the drawings, the reference numerals 1 and 2 indicate the two sections of which my improved device is composed, and which are arranged side-by-side, each section being composed of side pieces 3, 3, having inclined slots 4, cut in the under side thereof, in which are seated cross-beams. Any number of these slots may be employed, according to the number of cross-beams desired.

The reference numerals 5 indicate a series of transverse inclined cross-beams, seated in the slots 4, and rigidly secured thereto by means of bolts 6, passing at an angle therethrough, and through the side pieces 3. To the front side, or face, along the lower edge of the inclined beams 5, are attached strips of metal 7, of suitable size to avoid the wear, which would otherwise, necessarily occur to the beams, owing to the constant beating of the clods of dirt against the same. These metal strips or plates are secured to the inclined beams by means of bolts 8, which also serve to secure or attach a series of rearwardly curved teeth, or blades 9 to the opposite side of said beams. The teeth or blades 9 (one of which is more clearly shown in Fig. 3) are each provided at its front face with a sharp cutting edge 10, which serves to more effectually cut or crush the clods of dirt with which they come in contact during operation. These teeth or blades are each arranged along the rear side of the inclined beams 5, at suitable distances apart, as may be desired, and are preferably arranged at different relative positions or points on each beam, so that one tooth or blade will not ride or follow in the path or furrow of the one in front, or just preceding it. Thus it will be seen by this arrangement of teeth, that none of the ground over which the device is caused to travel will be left untouched or unharrowed.

The two sections 1 and 2, are each connected at their front ends to a draft-bar 11, by means of clevises, or other suitable attaching devices, and are so arranged that either section may be raised separately or independently of the other.

To the draft bar 11, about midway of the two sections 1 and 2, are hinged rods or bars 12, which, together with a connecting board 13, form a supporting-frame, for the seat, which frame rests upon the upper side of the inclined beams 5, of the two sections 1 and 2. Attached to the connecting-board 13, of the seat-supporting frame is a spring 14, of any suitable construction, for supporting the seat 15, said seat being attached to the rear end of a bar 16, which is hinged at its forward end to the draft-bar 11, and is adapted to be raised out of position as desired, and when in its normal position, rests upon the spring 14, whereby an easy seat is obtained. It will thus be seen that by this construction and arrangement of seat-frame and seat, the weight of the driver or attendant will be directly upon the center of the two harrow sections, and will in consequence thereof be distributed more equally over the whole surface of the two sections; this being brought about by reason of the weight on the seat proper, bearing directly upon the connecting-board 13, which is attached to the rods 12, resting centrally upon the two sections of the harrow or leveler.

It is obvious from the foregoing that the seat and its supporting frame are separate and entirely independent structures from the sections 1 and 2, thus allowing either part to be readily detached and replaced at will, and by its novel construction, will also permit of either of the sections 1 and 2 being raised, independent of the other, for the purpose of removing any foreign matter which might collect among the teeth or blades during its operation and use.

The operation of the device, which must be readily seen from the foregoing description, may be briefly stated as follows: Power being applied to the draft-bar 11, the device is caused to travel over the ground to be worked, the teeth or blades aided by the weight on the seat immediately entering the soil and serving to crush or pulverize the clods, while the inclined cross-beams serve to level the surface traversed, leaving the ground in a smooth and even condition.

What I claim as my invention is—

1. In a combined harrow and land leveler, the combination with the sections 1 and 2, formed of side-pieces 3, having inclined slots therein, of the beams 5, resting in said slots, and secured thereto by bolts, rearwardly curved teeth or blades attached to the rear side of the beams, a protecting plate 7, attached to the front face of said beams, a draft bar 11 to which the two sections are connected, and a seat frame and seat, hinged to said draft-bar, and resting upon the harrow proper, substantially as described.

2. In a combined harrow and land leveler, the combination with the sections 1 and 2, of a draft-bar 11, transversely in advance of and hinged to the said sections, and a seat-frame and seat hinged to said draft-bar, and adapted to fold back and rest upon the sections, substantially as described.

In testimony whereof I have hereunto set my hand in presence of two subscribing witnesses.

JAMES J. CALLENDER.

Witnesses:
F. H. McARTHUR,
GEO. S. WELLS.